United States Patent
Jones

(10) Patent No.: US 8,416,793 B2
(45) Date of Patent: Apr. 9, 2013

(54) METHOD AND APPARATUS FOR QUEUE DEPTH DETECTION IN A MEMORY SYSTEM

(75) Inventor: Thomas Carleton Jones, San Jose, CA (US)

(73) Assignee: Alcatel Lucent, Paris (FR)

( * ) Notice: Subject to any disclaimer, the term of this patent is extended or adjusted under 35 U.S.C. 154(b) by 1873 days.

(21) Appl. No.: 11/091,476

(22) Filed: Mar. 29, 2005

(65) Prior Publication Data
US 2006/0251090 A1 Nov. 9, 2006

(51) Int. Cl.
*H04L 12/56* (2006.01)

(52) U.S. Cl.
USPC ........ 370/412; 370/379; 370/383; 370/395.7; 710/57

(58) Field of Classification Search .................. 370/412, 370/382, 379–395.7; 365/189.01, 230; 710/57
See application file for complete search history.

(56) References Cited

U.S. PATENT DOCUMENTS

| | | | | |
|---|---|---|---|---|
| 4,374,428 A * | 2/1983 | Barnes | | 711/100 |
| 4,429,604 A * | 2/1984 | Eck et al. | | 84/655 |
| 4,833,651 A * | 5/1989 | Seltzer et al. | | 365/189.07 |
| 4,942,553 A * | 7/1990 | Dalrymple et al. | | 710/57 |
| 5,406,554 A * | 4/1995 | Parry | | 370/381 |
| 5,898,893 A * | 4/1999 | Alfke | | 710/57 |
| 6,263,410 B1 | 7/2001 | Kao et al. | | |
| 6,384,634 B1 * | 5/2002 | Brissette et al. | | 326/93 |
| 6,389,490 B1 * | 5/2002 | Camilleri et al. | | 710/57 |
| 6,434,642 B1 * | 8/2002 | Camilleri et al. | | 710/57 |
| 6,480,912 B1 * | 11/2002 | Safi | | 710/57 |
| 6,590,826 B1 * | 7/2003 | Sawyer | | 365/230.03 |
| 6,937,172 B1 * | 8/2005 | Lowe et al. | | 341/97 |
| 6,956,776 B1 * | 10/2005 | Lowe et al. | | 365/189.07 |
| 7,082,516 B1 * | 7/2006 | Tomazin et al. | | 712/204 |
| 2008/0129506 A1 * | 6/2008 | Schuessler | | 340/572.1 |
| 2010/0174877 A1 * | 7/2010 | Yagihashi | | 711/155 |

FOREIGN PATENT DOCUMENTS
WO WO 02/17494 2/2002

* cited by examiner

*Primary Examiner* — Michael Thier
*Assistant Examiner* — Vincelas Louis
(74) *Attorney, Agent, or Firm* — Kramer & Amado P.C.

(57) ABSTRACT

A method and apparatus for detecting a queue depth of a memory queue in a memory system is described. The method includes estimating a start position of the queue by examining a portion of a queue start identifier of the memory queue, estimating an end position of the queue by examining a portion of a queue end identifier of the memory queue, and utilizing the start position and the end position to estimate the queue depth of the memory queue. The apparatus applies the method. One embodiment of the method and apparatus may be suitable for implementation on look-up tables of field general programmable gate arrays.

20 Claims, 15 Drawing Sheets

| MEMORY LOCATION | REDUNDANT BIT | 3-BIT MEMORY LOCATION IDENTIFICATION | | |
|---|---|---|---|---|
| L1 | 0 | 0 | 0 | 0 |
| L2 | 0 | 0 | 0 | 1 |
| L3 | 0 | 0 | 1 | 0 |
| L4 | 0 | 0 | 1 | 1 |
| L5 | 0 | 1 | 0 | 0 |
| L6 | 0 | 1 | 0 | 1 |
| L7 | 0 | 1 | 1 | 0 |
| L8 | 0 | 1 | 1 | 1 |
| L1 | 1 | 0 | 0 | 0 |
| L2 | 1 | 0 | 0 | 1 |
| L3 | 1 | 0 | 1 | 0 |
| L4 | 1 | 0 | 1 | 1 |
| L5 | 1 | 1 | 0 | 0 |
| L6 | 1 | 1 | 0 | 1 |
| L7 | 1 | 1 | 1 | 0 |
| L8 | 1 | 1 | 1 | 1 |

FIG. 2

| wp 504 | rp 502 | ADJACENT | SAME |
|---|---|---|---|
| 0 0 | 0 0 | | |
| 0 0 | 0 1 | - | - |
| 0 0 | 1 0 | | 1 |
| 0 0 | 1 1 | 1 | |
| 0 1 | 0 0 | 1 | |
| 0 1 | 0 1 | | |
| 0 1 | 1 0 | | |
| 0 1 | 1 1 | | 1 |
| 1 0 | 0 0 | | 1 |
| 1 0 | 0 1 | 1 | |
| 1 0 | 1 0 | | |
| 1 0 | 1 1 | | |
| 1 1 | 0 0 | - | - |
| 1 1 | 0 1 | | 1 |
| 1 1 | 1 0 | 1 | |
| 1 1 | 1 1 | | |

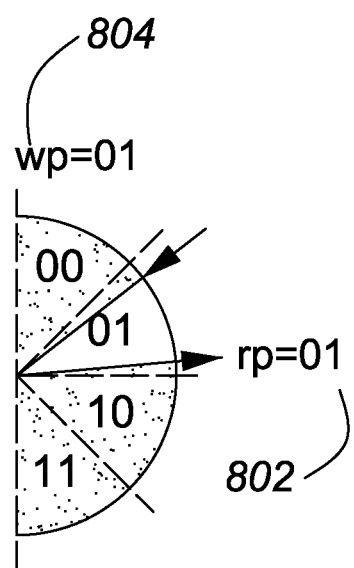 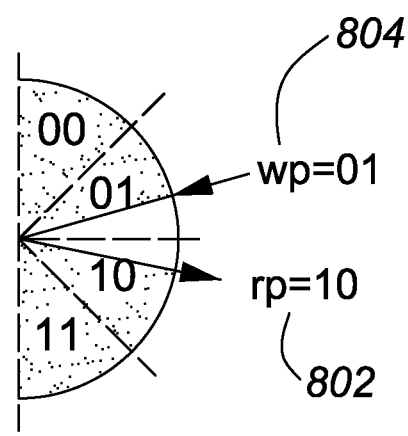
FIG. 11a     FIG. 11b

FIG. 12

| wp 804 | rp 802 | ALMOST_FULL-IF_ADJACENT |  |  | ALMOST_FULL-IF_SAME |  |  |
|---|---|---|---|---|---|---|---|
|  |  | OPTIMISTIC | NOMINAL | PESSIMISTIC | OPTIMISTIC | NOMINAL | PESSIMISTIC |
| 00 | 00 |  |  |  |  |  | 1 |
| 00 | 01 |  |  |  |  | 1 | 1 |
| 00 | 10 |  |  |  | 1 | 1 | 1 |
| 00 | 11 |  |  |  | 1 | 1 | 1 |
| 01 | 00 |  |  |  |  |  | 1 |
| 01 | 01 |  |  |  |  | 1 | 1 |
| 01 | 10 |  |  |  | 1 | 1 | 1 |
| 01 | 11 |  |  | 1 | 1 | 1 |  |
| 10 | 00 |  |  |  |  |  | 1 |
| 10 | 01 |  |  | 1 |  | 1 | 1 |
| 10 | 10 |  | 1 | 1 | 1 | 1 |  |
| 10 | 11 |  | 1 | 1 | 1 |  |  |
| 11 | 00 | 1 |  | 1 |  |  | 1 |
| 11 | 01 |  | 1 | 1 |  | 1 |  |
| 11 | 10 |  | 1 | 1 | 1 |  |  |
| 11 | 11 |  |  |  |  |  |  |

1200 — 1202 — 1204 — 1206 — 1208 — 1210 — 1212 — 1214 — 1216

| ADJACENT | SAME | IF_ADJACENT | IF_SAME | ALMOST FULL |
|---|---|---|---|---|
| 0 | 0 | 0 | 0 | |
| 0 | 0 | 0 | 1 | |
| 0 | 0 | 1 | 0 | |
| 0 | 0 | 1 | 1 | |
| 0 | 1 | 0 | 0 | |
| 0 | 1 | 0 | 1 | 1 |
| 0 | 1 | 1 | 0 | |
| 0 | 1 | 1 | 1 | 1 |
| 1 | 0 | 0 | 0 | |
| 1 | 0 | 0 | 1 | |
| 1 | 0 | 1 | 0 | 1 |
| 1 | 0 | 1 | 1 | 1 |
| 1 | 1 | 0 | 0 | |
| 1 | 1 | 0 | 1 | 1 |
| 1 | 1 | 1 | 0 | 1 |
| 1 | 1 | 1 | 1 | 1 |

FIG. 14

METHOD AND APPARATUS FOR QUEUE DEPTH DETECTION IN A MEMORY SYSTEM

FIELD OF INVENTION

The invention relates to the art of memory system controls and more specifically to the detection of queue depth in a memory system.

BACKGROUND OF THE INVENTION

In memory systems, it is common to implement data structures, such as first-in-first-out (FIFO) queues, for the storage and retrieval of data. FIFO queues may be implemented as a technique for processing a memory structure, in which items in the memory structure are removed in the same order in which they were added to the memory structure. FIFO queues may be utilized in memory systems of different applications. In some applications, FIFO queues are implemented on network elements, such as a network interface card (NIC), to provide sequential processing of data items to a network processor.

It may be advantageous in some applications to be able to detect the queue depth of a memory structure, such as a FIFO queue, at a particular time. That is, at any particular time, it may be advantageous to detect how much of the available memory to a queue is being used. Unless a memory system can expand indefinitely, queue depth detection may be useful to detect a queue "almost-full" condition, so as to provide an opportunity for the memory system, or a system utilizing the memory system, to take action before a "queue full" error arises. This may be particularly important in high speed NICs, in which data may fill available space in a FIFO queue quickly.

As such, there is a need for a method and apparatus that seeks to provide queue depth detection for memory systems.

SUMMARY OF THE INVENTION

In an aspect of the present invention, there is provided a method for detecting a queue depth of a memory queue in a memory system. The method comprises: estimating a start position of the queue by examining a portion of a queue start identifier of the memory queue; estimating an end position of the queue by examining a portion of a queue end identifier of the memory queue; and utilizing the start position and the end position to estimate the queue depth of the memory queue.

The queue start identifier may be a queue start memory pointer, and the queue end identifier may be a queue end memory pointer.

The memory queue may be a first-in-first-out queue, and the queue start and queue end memory pointers may be binary pointers.

The queue start identifier may comprise binary bits, and the portion of the queue start identifier may be a subset of the binary bits of the queue start identifier. The queue end identifier may also comprise binary bits, and the portion of the queue end identifier may be a subset of the binary bits of the queue end identifier.

The subset of binary bits of the queue start identifier may include the two most significant bits of the queue start pointer, and the subset of binary bits of the queue end identifier may include the two most significant bits of the queue end pointer.

The most significant bit of each of the queue start pointer and the queue end pointer may be a redundant bit for determining a queue full and a queue empty condition.

The subset of the binary bits of the queue start identifier may comprise the four most significant bits of the queue start memory pointer, and the subset of the binary bits of the queue end identifier may comprise the four most significant bits of the queue end memory pointer.

The queue depth to be detected is an almost empty condition of the memory queue. The queue depth to be detected is an almost full condition of the memory queue. An adjustable threshold may be provided for detecting the almost full condition or almost empty condition.

The first and second most significant bits of each of the queue start and queue end pointers may define one of four pointer quarters in a pointer space. The step of comparing the start position and the end position to estimate the queue depth of the memory queue may comprise: determining from the first and second most significant bits of each of the queue start and queue end pointers whether the queue start and queue end pointers identify adjacent pointer quarters or the same pointer quarter; and examining the third and forth most significant bits of each of the queue start and queue end pointers for detecting the almost full condition if the queue start and queue end pointers identify adjacent quarters or the same pointer quarter.

The steps of determining whether the queue start and queue end pointers identify adjacent pointer quarters or the same pointer quarter, examining the third and forth most significant bits and detecting the almost full condition may be performed with the use of look-up tables. The look-up tables may be found within one or more field programmable gate arrays.

The steps of determining whether the queue start and queue end pointers identify adjacent pointer quarters or the same pointer quarter, examining the third and forth most significant bits and detecting the almost full condition may be performed with the use of application specific integrated circuits.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2 is table of information relating to two pointers identifying memory locations in the memory queue of FIGS. 1a to 1d;

FIGS. 11a to 11b are block diagram representations of still other relationships between the memory location identifiers of FIG. 7;

FIG. 12 is a table of information relating to another relationship between the two memory location identifiers of FIG. 7 that may be used for the detection of queue depth;

FIG. 14 is a table of information relating to the implementation of the technique for the detection of queue depth of FIG. 13;

DETAILED DESCRIPTION OF AN EMBODIMENT

Figure 1A:
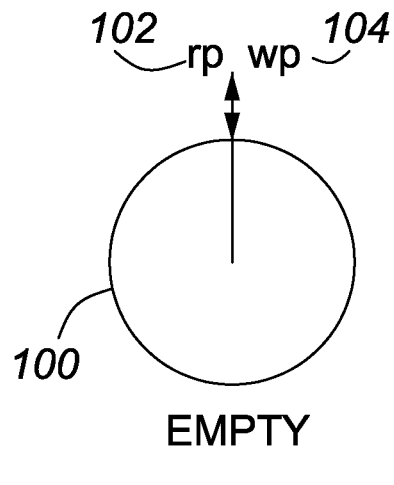
FIGS. 1a to 1d are block diagram representations of a memory queue in a memory system.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In a memory system, a data structure for a queue may be implemented by way of pointers to particular memory location. For instance, a FIFO queue may be implemented by way of a read pointer that refers to the memory location at which data is being removed from the queue, and a write pointer that refers to the memory location at which data is being stored to the queue. At initialization of such a FIFO queue, the read and write pointers refer to the same memory location. The first in, first out order is implemented by incrementing the write pointer to a new location as data in stored onto the queue, and then have the read pointer moved to follow the same memory location path as data is read, or removed, from the queue.

Figure 1B:
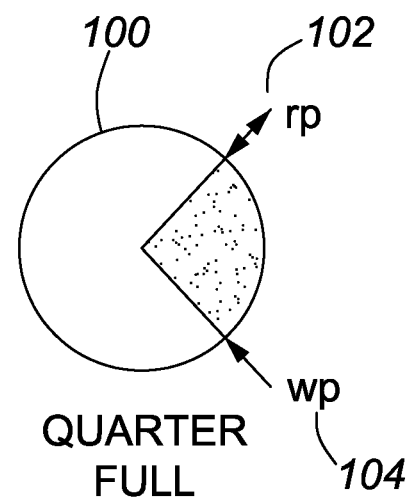
Figure 1C:
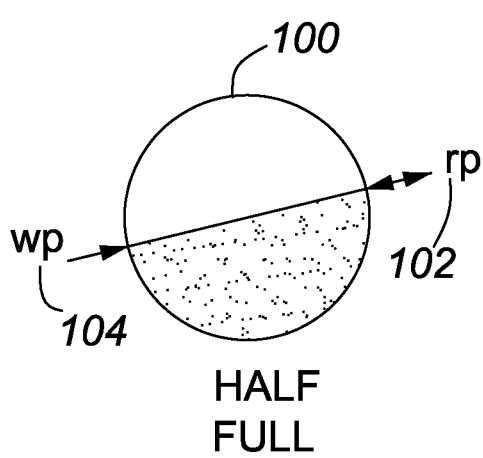
Figure 1D:
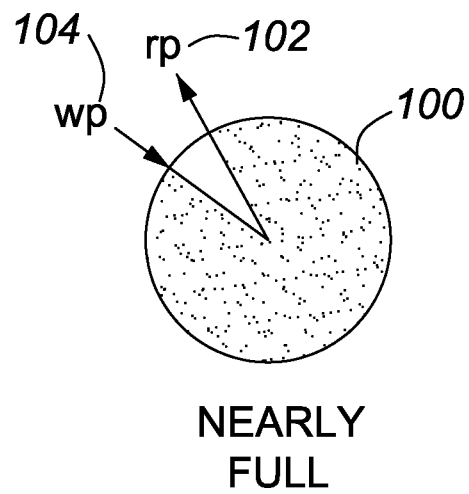

Referring to FIG. 1a to 1d, pictorial representations are shown of memory space that is occupied by a FIFO queue. It will be apparent to one of skill in this art that a circle may be used to represent the memory space of a FIFO queue defined by a read pointer (shown as "rp" and designated 102) and a write pointer (shown as "wp" and designated 104), and that each sweep or revolution of each pointer through the circle represents one complete traversal of the entire memory space allocated to the FIFO queue. Thus, in FIG. 1a, the memory space allocated to FIFO queue 100 is shown to be empty, with the read pointer 102 and writer pointer 104 both referring to the same memory location. In FIG. 1b, queue 100 as shown is approximately a quarter full, as the writer pointer 104 has moved ahead of the read pointer 102 by approximately one quarter of the addressable memory locations available to queue 100. In FIGS. 1c and 1d, queue 100 as shown is approximately half full and nearly full, respectively. It will be appreciated that as write pointer 104 sweeps around queue 100 and catches up to read pointer 102, queue 100 will experience a queue full condition, as any more data writing, that is, any more data being stored into queue 100, will overwrite data that has yet to be removed from queue 100 and cause data corruption. Thus, in an embodiment a read pointer may be a queue start identifier identifying the start position or location in memory where a queue begins, and a write pointer may be an queue end identifier identifying the end position or location of the queue in memory. As the queue start and end identifiers for the embodiment are also memory pointers, they may also be referred to as a queue start pointer and a queue end pointer.

A feature of memory queues, and particularly FIFO queues, is that the memory locations may be addressed in a logically sequential manner. Thus, while the memory queue may occupy non-contiguous blocks of physical memory, a queue may be establish for an application in a memory system if the memory locations may be address according to a logically sequential scheme. In an embodiment described below, a sequentially addressable set of memory locations is assumed, but it will be appreciated that such a sequentially addressable set of memory locations may be generated as necessary in another embodiment, or may be provided by another application, such as a software application in the operating system layer, in other embodiments. Thus, in another embodiment a non-sequential but deterministic addressing scheme may be implemented.

It will thus be appreciated by one of skill in this art that with pointers 102 and 104, queue full and queue empty conditions may be indicated by both read pointer 102 and write pointer 104 referring to the same memory location. In an embodiment, pointers 102 and 104 may be implemented as binary pointers, and since a situation in which pointers 102 and 104 referring to the same memory location denotes either a queue full or queue empty condition, to distinguish between a the full or empty condition, there may be a redundant, high-order bit appended to the FIFO read and write pointers 102 and 104. This extra redundant bit may be added as the most significant bit (MSB) of the pointers, and may be used to determine queue "full" and queue "empty" conditions of the queue. For instance, in FIG. 2 there is a table showing a list of memory locations that are referable in an embodiment in which pointer 102 and 104 are implemented with the use of binary pointers of 3 bits length. As shown in FIG. 2, the 3-bit binary points may address eight separate memory locations, which are shown as L1 to L8 in the table. If both read an write pointers 102 and 104 are of 3 bit length, a redundant MSB may be appended to each pointer 102 and 104, and thus provide a 4-bit pointer to each of pointer 102 and 104, as shown in FIG. 2.

Assume now that both read and writer pointers 102 and 104 are set to identify memory location L1 initially when queue 100 is empty, and each binary pointer, including the redundant bit, provides "0000". As data items are inserted into queue 100, write pointer 104 may be sequentially incremented after each memory location is stored with a data item. For instance, after the first data item is inserted into queue 100 at location L1, write pointer 104 may be incremented by one to "0001" which refers to memory location L2. Thus, if there are no read operations to remove data items, when the last memory location L8 is filled, writer pointer 104 will be incremented from "0111" to "1000". The 3 least significant bits of write pointer 104 now refer to memory location L1 by "000", which already has data, but the redundant MSB is now "1"

instead of "0". Now, since there has been no read operations to remove data items from queue 100, read pointer 102 is still "0000", which also refers to memory location L1 and had valid data. However, the redundant MSB of read pointer 102 is "0", rather than "1" which is the value of the redundant MSB of write pointer 104.

Now, if data starts to be read from queue 100, read pointer 102 will progress through memory locations L1 to L8 after each read operation, as described above with respect to pointer 102. When the last data item is read from memory location L8, the value of read pointer 102 will increment from "0111" to "1000". Thus, read pointer 102 is now also referring to the same memory location, that is location L1, as write pointer 104. Now, not only are the 3 least significant bits of each pointer 102 and 104 is identical, the redundant MSB of each pointer is also identical.

Thus, it will be appreciated that a queue empty condition may be distinguished from a queue full condition by way of comparing the redundant MSB of each of read pointer 102 and write pointer 104. If the redundant MSBs are identical, then a queue empty condition is detected, and if the redundant MSBs are different, then a queue full condition is detected. This determination may be by a direct comparison of read pointer and write pointers of a memory system given by the following formulas:

empty:=rd_ptr==wr_ptr;
full:=rd_ptr[n]!=wr_ptr[n]&& rd_ptr[n-1:0]=wr_ptr[n-1:0];
    where rd_ptr is the read pointer,
        wr_ptr is the write pointer, and
            n+1 is the bit length of the pointers given by $n = \log_2$(Queue Depth)

Thus, n is the required pointer length given by log 2(Queue Depth), and n+1 is the pointer length with the redundant most significant bit. Details on the determination of absolute queue full and queue empty conditions is described in Cummings, Clifford E., *Simulation and Synthesis Techniques for Asynchronous FIFO Design* (Rev 1.1), SNUG 2002, Sunburst Design, Inc., San Jose, http://www.sunburst-design.com/papers/CummingsSNUG2002SJ_FIFO2_rev1_1.pdf, the contents of which are hereby incorporated by reference.

The simple determination of a queue full and queue empty condition may not yield sufficient information in some applications for which it may be desirable to obtain intelligence as to the queue depth itself rather than simply an indication of the absolute full or empty conditions. For instance, it may be advantageous to detect a queue "almost full" condition or a queue "almost empty" condition so that a "warning window" of time may be provided before the actual absolute queue full or queue empty conditions are encountered. For example, an almost full condition may be useful in applications in which a data producer (or data writer) cannot respond sufficiently fast enough to a queue "full" condition to slow or stop a of data into a queue before overflowing the FIFO. This may be particularly useful in applications at an inter-chip interface of, for instance, one or more network interface cards where the detection of only an absolute queue full condition does not provide enough time to avoid a queue overflow condition if the "skid distance" of an interface exceeds a single clock cycle. A skid distance may be considered the distance, in data units, from when a command is issued to stop data flow, and when the data flow stops. Thus, skid distance may be determined as "skid time×data rate", and thus, for example, if a transfer rate is 1 byte/sec and it takes one second for a stop command to stop the data flow, then the skid distance would be 1 byte. It may also be advantageous to detect an "almost empty" condition, for example, at the restart of a memory service such that a queue never runs empty and an uninterrupted flow of data is seen at the queue read interface while freeing data producers to process other tasks.

In an embodiment, the queue depth of a queue may be detected by way of examining a portion of memory location identifiers, such as the most significant bits of read and write pointers of a FIFO queue, to obtain an estimate of the queue depth. This estimate of queue depth may be useful for determining queue "almost full" and "almost empty" conditions.

Figure 3:
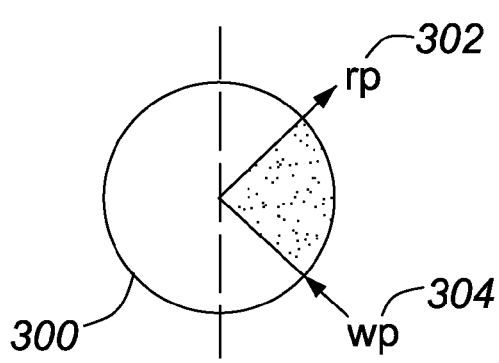
FIG. 3 is a block diagram representation of a memory queue in a memory system in another embodiment of the present invention.

Referring to FIG. 3, the detection of queue depth, such as for queue 300, may be conducted by way of examining a subset of memory location information, such as the most significant bits of binary pointers relating to the read pointer 302 and write pointer 304. Like queue 100 described above, queue 300 may be accessed by binary read pointer 302 and write pointer 304. For the embodiment, pointers 302 and 304 are also provided with a redundant MSB, that may provided for detection of queue full or queue empty conditions, and each of pointers 302 and 304 are of n-bits, including the redundant MSB. For the examples below given for illustrative purposes, pointers 302 and 304 of at least 4 bits, including the redundant MSB. Thus, for the illustrated examples, the addressable memory locations of queue 300 is at least 3 bits, and hence there are at least eight memory locations of queue 300. It will be appreciated that pointers of having a greater or lesser number of bits may be used to reference memory queues having greater or lesser memory locations.

Figure 4:
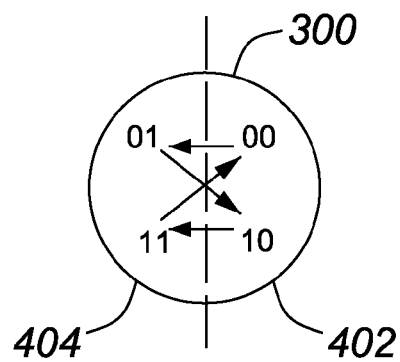
FIG. 4 is an alternate block diagram representation of the memory queue of FIG. 3.

Referring to FIG. 4, in detecting the queue depth of queue 300, the actual pointer space (including redundant bit) that may be identified by pointers 302 and 304 may be partitioned into four equal parts as defined by the two upper bits (n:n−1) of each of the pointers. Thus, for each of pointers 302 and 304, the two upper bits may change in value from "00" to "01" to "10" to "11" in repeating succession. Thus, the two upper bits of each pointer 302, 304 may be used to place the pointer in one of four quadrants in the pointer space, and also place the pointer in one of two halves in the memory space of queue 300. This arises because the redundant MSB is not being used for memory location referencing. Thus, only bit n−1 of the two upper bits of pointers 302, 304 may be used to place the pointer in the memory space of queue 300, and the two upper bits may be used to place pointer 302 or 304 in one of two halves of the memory space of queue 300 (shown on FIG. 4 as half 402 defined by bit n−1=0, and half 404 defined by bit n−1=1).

Figure 5A:
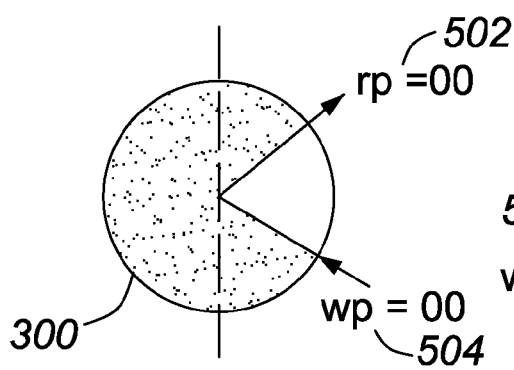
FIGS. 5a to 5c are alternate block diagram representations of the memory queue of FIG. 3.
Figure 5B:
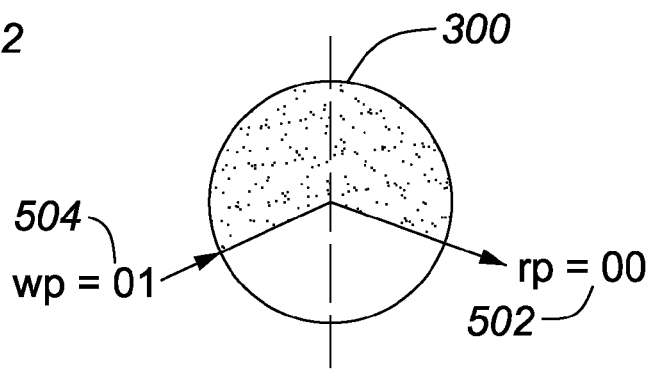

A comparison of the upper two bits of read pointer 302 and write pointer 304 may be performed to determine if the pointers 302 and 304 are in "adjacent" pointer quadrants or the "same" quadrant, or neither adjacent nor in the same quadrant in the pointer space. This comparison may be referred to as a "course-grained comparison". With reference to the actual memory space of queue 300, a course-grained comparison determines if the pointers are in an adjacent half or same half of the memory space. For example, referring to FIG. 5b if the upper-most two bits of read pointer 302, shown as rp 502, identifies the pointer in quadrant "00", and the upper-most two bits of write pointer 304, shown as wp 504, shows that write pointer 304 has swung around to "10", the pointers may be considered "logically adjacent". Similarly, referring to FIG. 5c, if the upper-most two bits of read pointer 302, shown as rp 502, is in quadrant "01" and the upper-most two bits of write pointer 304, shown as wp 504, has wrapped around to "11", then the pointers may be considered to be in the "logically same" quadrant. Thus, it will be appreciated that with a course-grained comparison using the two upper-most bits rp 502 and wp 504 of read and write pointers 302 and 304, respectively, the queue depth of queue 300 may be estimated as between empty and half full when the pointers are logically adjacent (as shown in FIG. 5a), and between half full and full when the pointers are in the same logical quadrant (as shown in FIG. 5b).

Figure 7:
FIG. 7 is a table of information relating to a relationship between two memory location identifiers in the memory queue of FIG. 3 that may be used for the detection of queue depth.

As the above technique for course-grained comparison is based on pointers 302 and 304 each having a redundant MSB for queue full or empty conditions, the above technique need not be concerned with a queue full or empty situation as a memory system associated with queue 300 may be taken to have other mechanisms, such as additional control logic (not shown), to ensures that the FIFO never overflows or underflows does not occur. Thus, a logical situation where wp 501 is "11" and rp 502 is "00", or other situations in which the write pointer 304 catches up or overtakes read pointer 302, may be ignored Progressively finer estimation of queue depth may be obtained by examination of an increasing number of most-significant bits corresponding to pointers 302 and 304. For instance, if the next two most significant bits of pointers 302 and 304 are also examined (that is, examining bits n−2:n−3), finer resolution as to the determination of queue depth for queue 300 may be provided. Referring to FIG. 7, the memory space of queue 300 is shown again with next two most significant bits n−2:n−3 also examined. From the course-grained comparison technique discussed above, it was shown that queue 300 may be divided into halves 402 and 404. Now, with the examination of the next two most significant bits n−2:n−3 in a fine-grained examination, each of halves 402 and 404 may be divided into quarters, or with reference to the pointer space, sub-quarters. Thus, as shown there are sub-quarters 602, 604, 606, and 608 corresponding to half 402; and sub-quarters 610, 612, 614 and 616 corresponding to half 404. With examination of the four most significant bits of pointers 302 and 304, it can be determined at any time the sub-quarter(s) of queue 300 that each of read pointer 302 or write pointer 304 is referencing. Thus, by examining the four most significant bits of pointers 302 (including the redundant MSB), then it may be determined that (i) if both pointers 302 and 304 are pointing within the same sub-quarter, the queue depth may be determined as between empty and ⅛ full (recalling that the queue full condition may be ignored), and (ii) if pointer 304 is ahead of pointer 302 by more than one sub-quarter (that is, the pointers are in different sub-quarters), the queue depth may be determined within a resolution of ¼ the memory space in the range between but not including queue full or queue empty.

Thus, it will be appreciated that greater resolution in the detection of queue depth in a memory system may be obtained with examination of a greater number of bits in each of the read and write pointers of a queue. The choice as to the number of bits to examine may vary between different applications and memory systems being considered, and may include considerations of different factors such as the precision of queue depth estimation required, the size of the memory allocated to a queue, the amount of software or hardware logic (or a combination of software and hardware logic) required to examine the bits, and the desired response time for detecting the queue depth of the memory system under consideration.

One application of the queue depth detection technique describe above is to determine a queue "almost full" condition of a FIFO queue in a memory system. Referring again to FIGS. 5a to 5c and queue 300 shown therein, in one embodiment there is provided a technique for determining an almost full condition for queue 300 by examining the 4 most significant bits of read pointer 302 and write pointer 304. It will be appreciated by one of skill in this art that the technique described below may be readily modified to determine a queue "almost empty" condition, or to determine when a queue is at a particular estimated depth.

For an embodiment, the detection of an almost full condition for queue 300 is conducted by way of a course-grained comparison of the two most significant bits (n:n−1; including the redundant MSB), and a fine grained comparison of the nest two most significant bits (n−2:n−3). Due to the binary nature of pointers 302 and 304, the examination of two bits in each of the course-grained and fine-grained comparison may be suitable for implemented by way of a 4-input look-up table (LUT) architecture that may be found in modern static RAM-based field programmable gate arrays (FPGA). However, it will be appreciated the detection technique described below may also be utilized to reduce application specific integrated circuit (ASIC) libraries which contain complex logic gates. Still further, it will be appreciated that the detection technique described below may be suitable for use in other memory systems, as will be apparent to those of skill in this art.

Course-Grained Comparison

In an embodiment, the comparison of the two high-order bits (n:n−1) from each pointer 302 and 304 may be accomplished by using 4-input loot-up tables (LUT) implemented on a FPGA. It will be appreciated that such a table would have twelve entries (or rows) corresponding to different combinations of the two high-order bits of pointers 302 and 304. Referring to table 700 of FIG. 7, column 702 provides the different combinations of the write pointer 304, and column 704 provides the combinations of read pointer 304. Column 704 provides, with the binary value "1", situations in which the combination of read pointer 302 and write pointer 304 in which an "adjacent" or "same" situation may be declared. In an embodiment, each of the "adjacent" or "same" condition may be determined by a 4-input LUT in a FPGA, as describe later below.

Figure 5C:
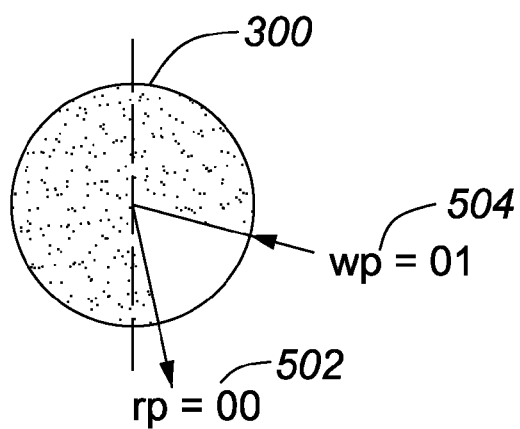

With reference to FIGS. 5a to 5c, examples for the construction of four entries of table 700 is provided below. It will be appreciated that other entries in table 700 may be completed in the same manner, and that table 700 may be generated using a different technique in other embodiments. For the embodiment, first suppose that while read pointer 302 may be incrementing as data is read from queue 300, it stays within quadrant "00" identified by its two most significant bits, shown as rp 502, in all four exemplary scenarios considered (that is, the two most significant bits rp 502 remain "00" throughout). Now, if the two most significant bits of write pointer 304, shown as wp 504, also provide "00", then the relationship of between the pointers may be illustrated as FIG. 5a. As shown, queue 300 is nowhere near full, and thus pointers 302 and 304 are considered to be neither "adjacent" nor in the "same" logical quadrant. Thus, referring to FIG. 7, the first entry in which wp 504 is "00" and rp 504 is "00", is not identified as "adjacent" or "same".

Now, if write pointer 304 swings into the next quadrant and wp 502 is "01", the situation is that as shown on FIG. 5b. In this situation, pointers 302 and 304 are considered to be in "adjacent" quadrants. Thus, the value of "adjacent" is set to "1" (or any positive indicator) in the fifth row of table 700 having a bit combination of "0100", which combination is the combined value of wp 504 being "01" and rp 502 being "00".

If write pointer 304 then wraps back into the first half of the memory space, that is, into quadrant "10" identified by wp 504, the situation is a shown in FIG. 5c. In this situation, pointers 302 and 304 are considered to be in the "same" logical quadrant, and thus the value of "same" is set to "1" (or any other positive indicator) in the ninth row of table 700 having a bit combination of "1000", which combination is the combined value of wp 504 being "10" and rp 502 being "00".

Finally, if the wp 504 becomes "11" while rp 502 is "00", that is, if write pointer 304 ever surpasses read pointer 302, then it can be assumed that an error has occurred since, as described, the condition of an actual queue overflow is protected against by other techniques, such as additional logic, in the embodiment. Thus, scenarios such as "1100" in table 700, being the combined value of wp 504 being "11" and rp 502 being "00", may be marked as "don't-care" combinations and set to logical "0" in an embodiment utilizing a FPGA LUT architecture. In an ASIC implementation, these combinations may be set to "don't-care" to reduce the elements in an ASIC library. Other "don't-care" situations in table 700 identified with wp 504 and rp 502 combinations of "0001", "0110" and "1011" are shown.

According to the above describe technique, the values of "adjacent" and "same" may be completed for the rest of table 700, as shown in FIG. 7. Using the values of table 700, two LUTs may be implemented in a FPGA to determine if the course-grained comparison yields an "adjacent" or "same" condition. This provides some insight into the queue depth of queue 300, and may be combined with the results of the fine-grained comparison described below to detect an "almost full" condition of queue 300. It will be appreciated that if the course-grained comparison yields neither "adjacent" nor "same", then queue 300 must not be anywhere near full and hence an "almost full" condition would not be declared.

Fine-Grained Comparison

Similarly to the technique described above with respect to the course-grained comparison, two fine-grained comparisons may also be performed on the next two most significant bits of the pointers 302 and 304, shown as rp 802 for read pointer 302 and wp 804 for write pointer 304 with reference to FIGS. 8a to 11b. While the fine-grained comparison described below detects an almost full condition based on whether the course-grained comparison yields a result of "adjacent" or "same" quadrant, it will be appreciated that the fine-grained comparison may be performed concurrently with the course-grained comparison in applications for which a fast response time is desired, as described later below.

Figure 6:
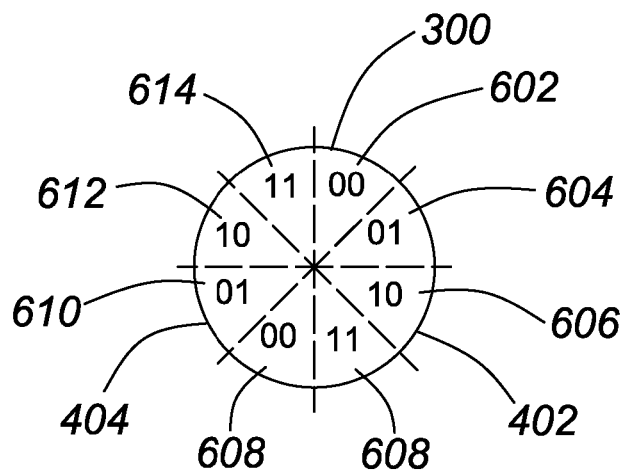
FIG. 6 is another alternate block diagram representation of the memory queue of FIG. 3.

As described above with reference to FIG. 6, the examination of bits rp 802 and wp 804 (that is, bits n−2:n−3) further subdivides each quarter of the pointer space associated with queue 300 into four sub-quadrants, as shown in FIG. 6. In the fine-grained comparison for determining a queue almost full condition, there is some flexibility for setting the threshold of "almost full". For instance, in this example of queue depth detection for queue 300, there is provided three exemplary threshold levels: optimistic; nominal; and pessimistic. These different threshold levels pertain to how closely write pointer 304 is permitted to approach read pointer 302 before an "almost full" condition is declared. Thus, it will be appreciated that the threshold may be considered the queue depth at which an almost full condition may be asserted, and that this threshold is adjustable according to the requirements of a particular application.

Figure 8A:
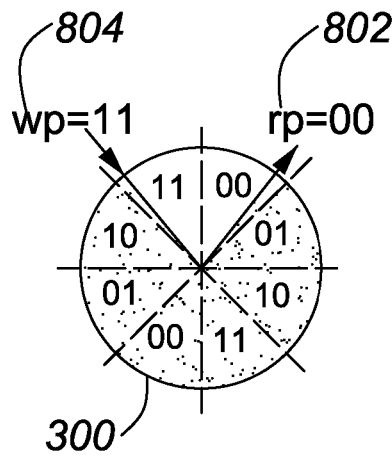
FIGS. 8a to 8b are block diagram representations of relationships between the memory location identifiers of FIG. 7.
Figure 8B:
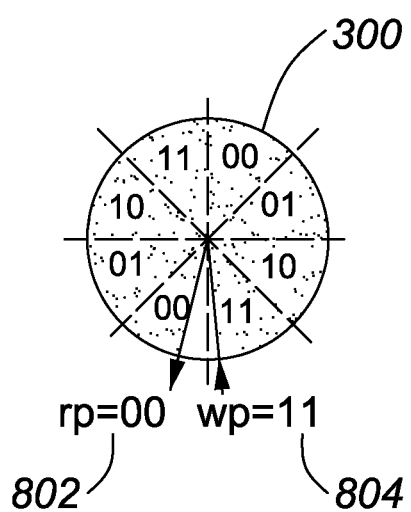

For instance, if the course-grained comparison indicates that pointers 302 and 304 are in "adjacent" quadrants, then in an "optimistic" setting an almost full condition may be set to be declared only when there is not a single sub-quadrant separating pointers 302 and 304. For this optimistic threshold scenario, if the course-grained comparison shows "adjacent", then there are only two occurrences of rp 802 and wp 804 that would yield an almost full condition, as shown in FIG. 8a and 8b. However, it will be noted that in both occurrences, the value of wp 804 is "11" and rp 802 is "00". Thus, if the course-grained comparison showed that the quadrants are adjacent, then the fine-grained comparison determine an almost full condition when the combination of wp 804 and rp 802 is "1100". This situation of almost full may be entered into a table 1200 in FIG. 12 under in column 1206 when the combination of wp 804 and rp 802 is "1100".

Figure 9A:
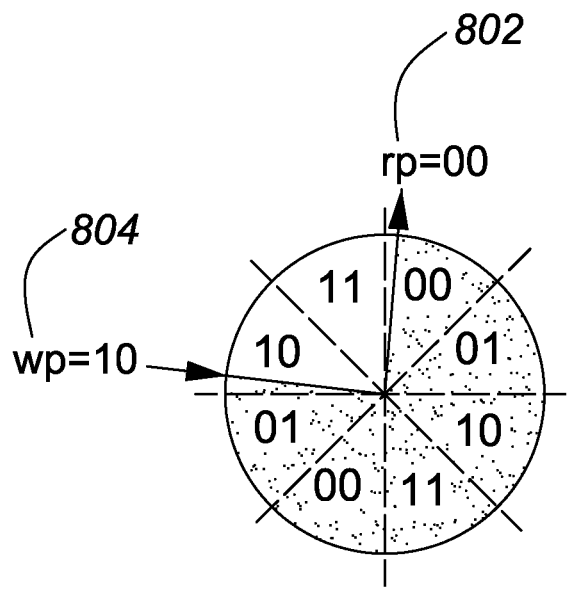
FIGS. 9a to 9b are block diagram representations of other relationships between the memory location identifiers of FIG. 7.
Figure 9B:
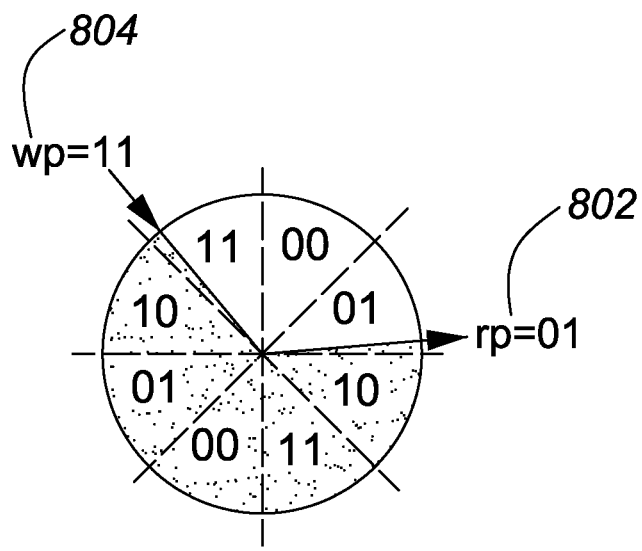

For the embodiment, a "nominal" threshold may include combinations of pointers 302 and 304 where they are separated by a sub-quadrant, as shown in FIGS. 9a and 9b. These wp 804 and rp 802 combinations of "1000", "1100", "1101" may also be marked as "almost full if_adjacent" in column 1208 of table 1200. It will be appreciated that a more pessimistic threshold always subsumes the more optimistic situations, and hence combination wp 804 and rp 802 combination "1100" is included in the "nominal" threshold cases.

Figure 10A:
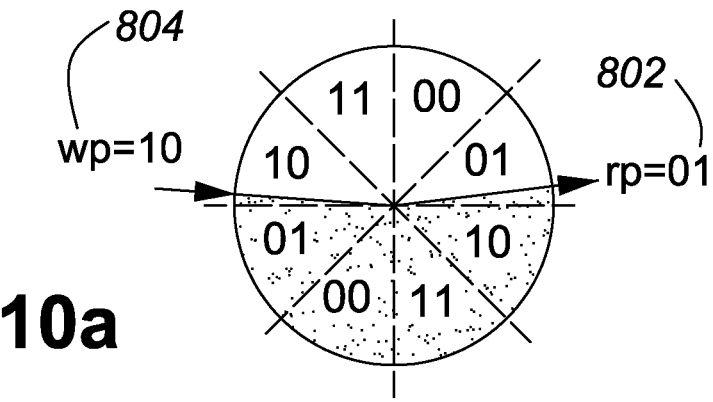
FIGS. 10a to 10c are block diagram representations of yet other relationships between the memory location identifiers of FIG. 7
Figure 10B:
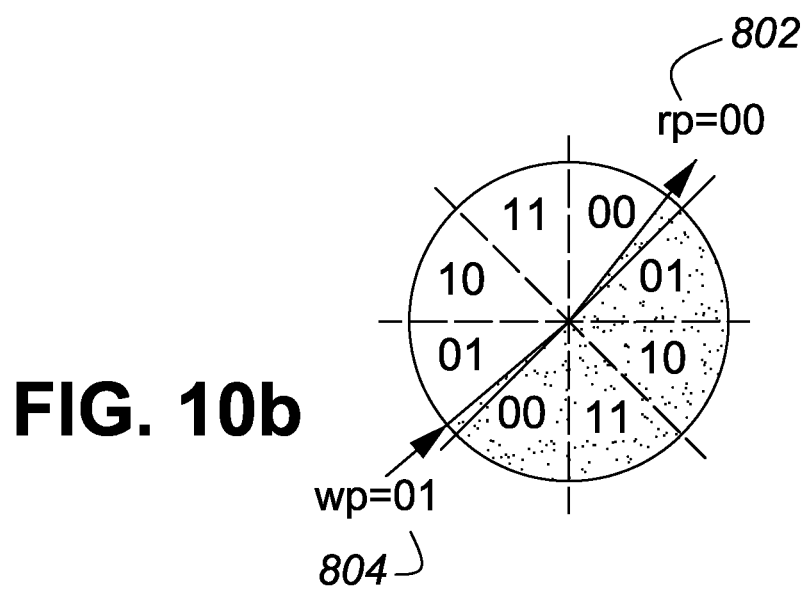
Figure 10C:
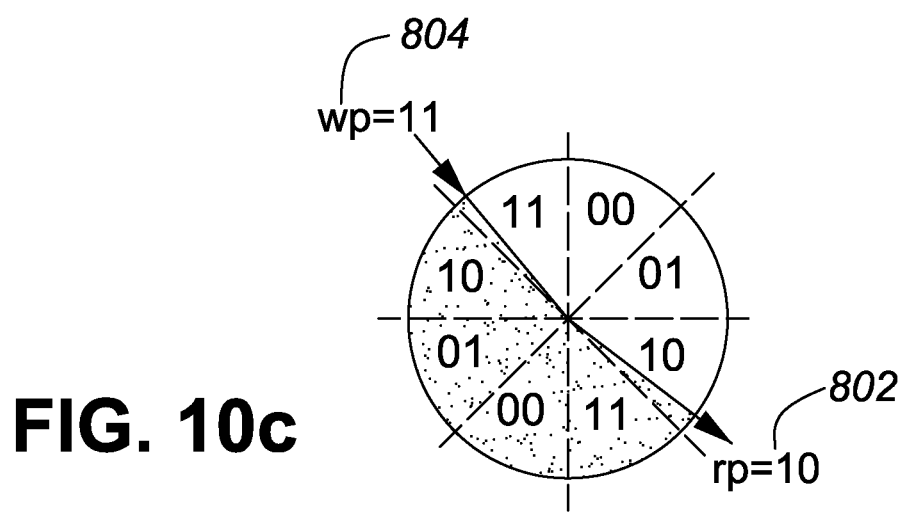

For an even more pessimistic threshold in which an almost full condition may be declared when there are two sub-quadrants separating read pointer 302 from write pointer 304, as shown in FIGS. 10a to 10c. From this, entries for almost full when the course-grained comparison shows "adjacent" is added to column 1210 of table 1200, in addition to the more optimistic identified situations of "optimistic" and "nominal" that will be subsumed in the "pessimistic" scenarios identified in column 1206.

If the course-grained comparison produced a condition of a "same" logical quadrant, the same threshold of optimistic, nominal, and pessimistic, then a respective zero, one or two sub-quadrant separation may also be determined. For the optimistic threshold, pointers 302 and 304 are declared "almost full" if the pointers lie in adjacent sub-quadrants or the same sub-quadrant, as shown in FIG. 11a and 11b, which shows two of the seven possible scenarios of wp 804 and rp 802 combinations of "0000", "0001", "0101", "0110", "1010", and "1111" for a "same" condition. These values are shown in column 1212 of table 1200. It will be appreciated that since pointers 302 and 304 are in the same quadrant, only one half of the circle representing queue 300 need be analyzed as shown in FIGS. 11a and 11b.

Like the "if_adjacent" scenario, the more pessimistic thresholds of "nominal" and "pessimistic" for the "if_same" scenario would require the addition of combinations of pointers 302 and 304 at which they are respectively one or two sub-quadrants apart. These combinations of wp 804 and rp 802 for which an almost full condition may be declared when the course-grained comparison indicates that pointers 302 and 304 are in the same quadrant are shown in column 1214 for the nominal threshold, and in column 1216 for the pessimistic threshold, as shown in table 1200. Thus, table 1200 shows the combinations of wp 804 in column 1202 and rp 802 in column 1204, that will produce different results of "almost full" in "if_adjacent" and "if_same" scenarios of varying optimism.

Thus, based on the course-grained comparison and on the fine-grained comparison with a set threshold, an almost full condition of queue 300 may be detected. For the embodiment, the results of the course-grained and fine-grained comparisons may be combined to determine an almost full condition with the following rule:

almost_full:=(adjacent && if_adjacent)||(same && if_same)

Figure 13:
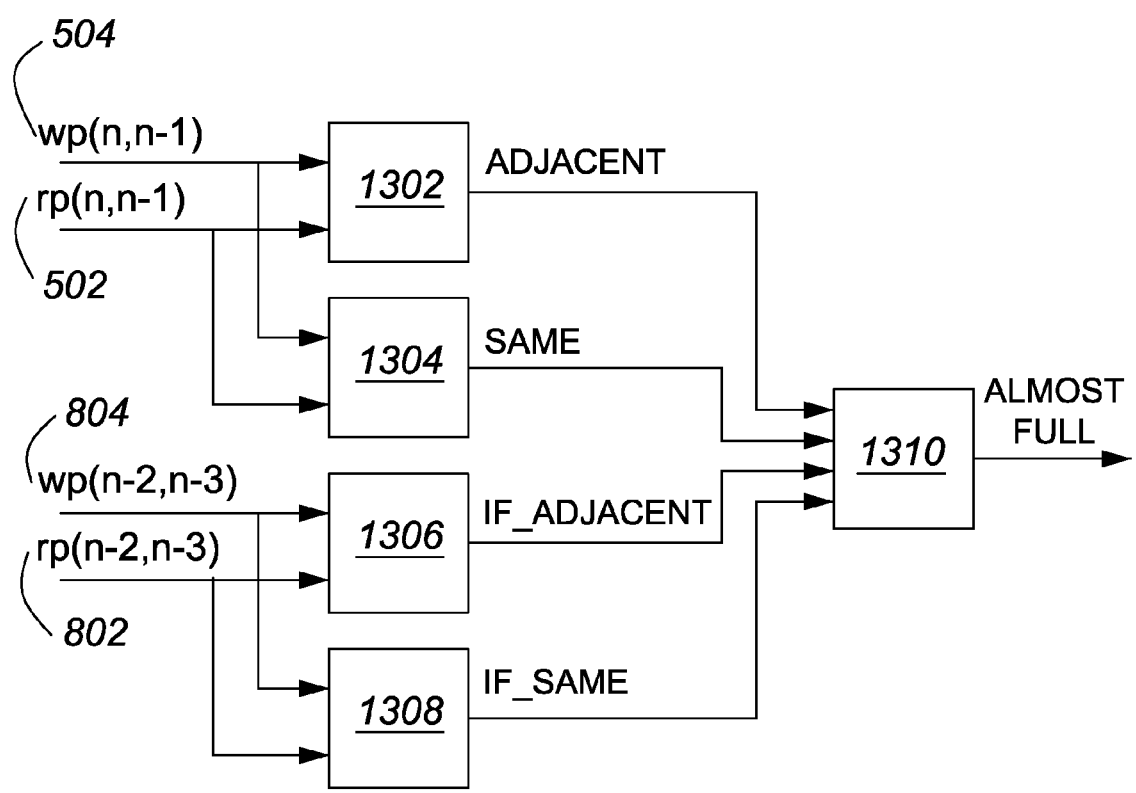
FIG. 13 is a block diagram of an implementation of a technique for the detection of queue depth using the information from the tables of FIGS. 3 and 7.

It will be appreciated that this rule is also suitable for a 4-input LUT. Thus, for an embodiment, the entire detection of an almost full condition as described above may be implemented on five 4-input LUTs as shown in FIG. 13. It will be appreciated that by having the arrangement as shown, the entire detection of an almost full condition may be carried out in only two gate delays, which may be advantageous for applications in which a fast response time is desired.

Referring to FIG. 13, LUT 1302 is provided to receive as inputs wp 504 and rp 502 with each bit of wp 504 and rp 502 being one of the four inputs to LUT 1302. As described above, wp 504 and rp 502 correspond to the two most significant bits of pointers 304 and 302, respectively. A table look up is performed at LUT 1302 for "adjacent" as defined in column 706 of table 700 shown in FIG. 7. LUT 1304 is also configured to receive as inputs the four bits of wp 504 and rp 502 and perform a table look up for "same" as defined in column 706 of table 700. Thus, if the bit combination of wp 504 and rp 502 resolves into "adjacent", then the output for LUT 1302, shown as "adjacent", is set to "1"; otherwise, the output is "0". For LUT 1304, if combination of wp 504 and rp 502 resolves into "same", then the output for LUT 1304, shown as "same", is set to "1"; otherwise, the output is "0".

For the fine-grained comparison, a threshold level, such as optimistic, nominal, and pessimistic as described above, is selected and implemented within LUTs 1306 and 1308. For a particular threshold level, LUT 1306 is configured to receive as inputs the four bits of wp 804 and rp 802 combined, corresponding to the second pair of most significant bits (n−2:n−3) of pointers 304 and 302, respectively. For a particular threshold level, LUT 1306 determines if an almost full condition would arise if the course-grained comparison of the two most significant bits of pointers 304 and 302 yields an "adjacent" result, according to columns 1206, 1208 or 1210 of table 1200 shown in FIG. 12. This output of LUT 1306 for declaring an almost full condition for "adjacent" course-grained results is shown as "if_adjacent" in FIG. 13. LUT 1308 also receives the four bits of wp 804 and rp 802 as inputs, and provides a look up at a particular threshold level according to columns 1212, 1214 or 1216 of table 1200 to determine an almost full condition for situations where the two most significant bits of pointers 304 and 302 yields a "same" result. The output of LUT 1308 declaring an almost full condition for "same" course-grained results is shown as "if_same" in FIG. 13.

Finally, LUT 1310 receives as its 4-inputs: (i) "adjacent" from LUT 1302, (ii) "same" from LUT 1304, (iii) "if_adjacent" from LUT 1306, and (iv) "if_same" from LUT 1308. A further lookup is performed in LUT 1308 to declare an almost full condition for queue 300 according to the rule almost_full: =(adjacent && if_adjacent)||(same && if_same), which may be shown in tabular form in FIG. 14.

While the above embodiment describes a pre-selected threshold for the fine grained comparison, it will be appreciated that in other embodiments threshold levels may be selectable and adjusted in hardware or software. Further, it will be appreciated that other combinations of software or hardware logic may be used in conjunction or in lieu of LUTs in other embodiments to detect an almost full condition of a queue.

Figure 15:
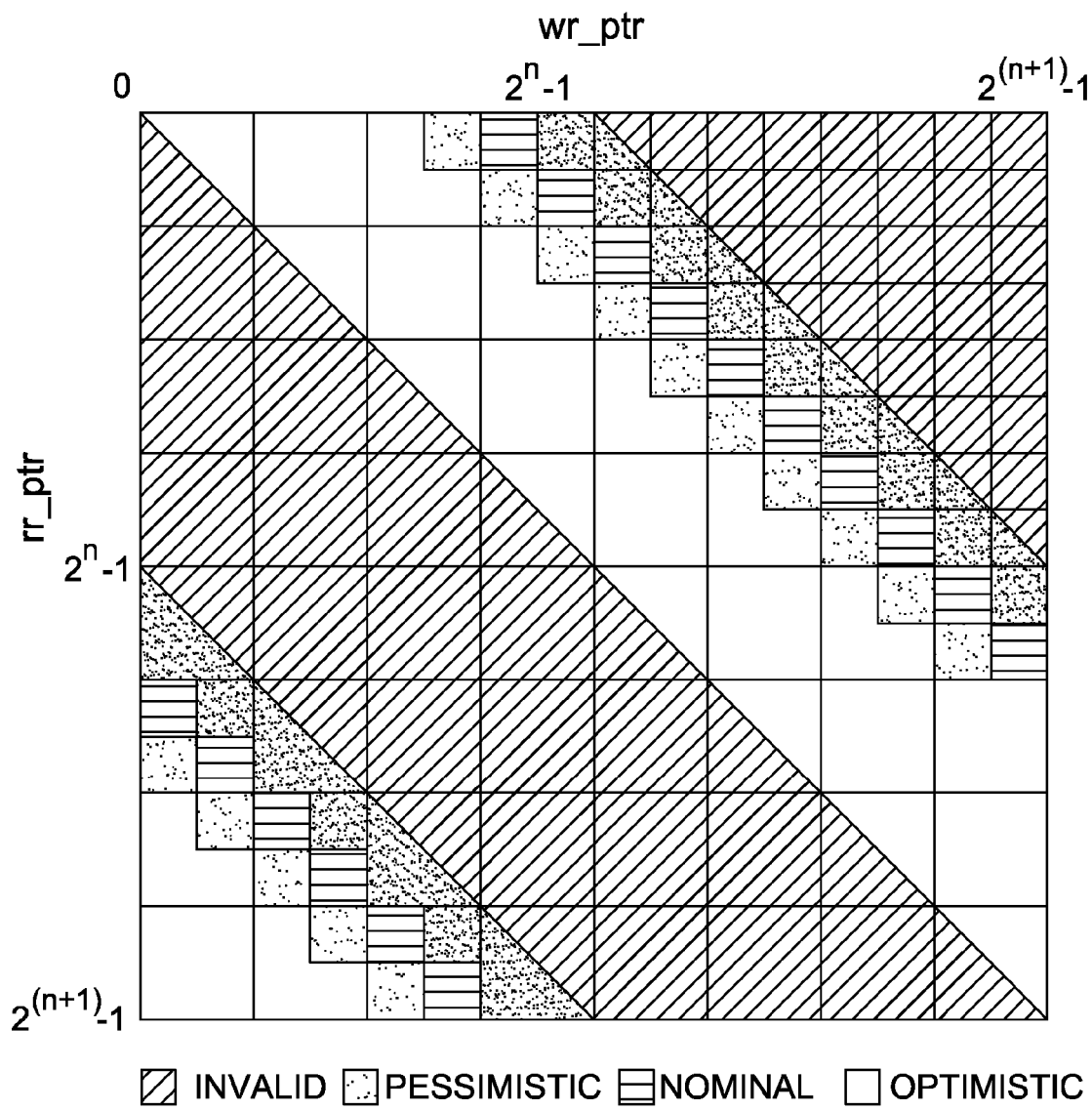
FIG. 15 if a graphical representation of a result of the detection of queue depth according to the implementation of FIG. 13.

Referring to FIG. 15, there is an illustration of the behaviour of the almost full status condition to assert for different values of read pointer, write pointer and threshold levels. It will be appreciated that since only the upper most significant four bits are examined in an embodiment, the diagram shown in FIG. 15 scales to any size of read and write pointers of four bits or greater, (ie., where n≧4, including the redundant MSB).

Figure 16:
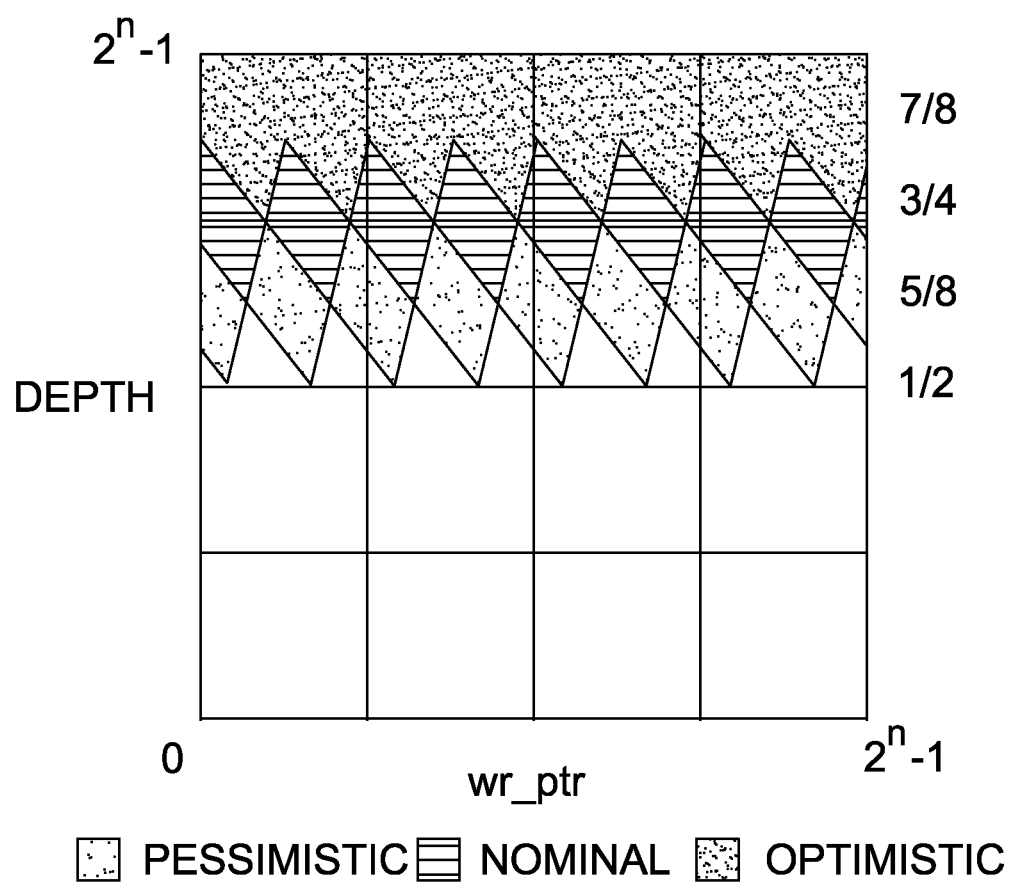
FIG. 16 is an alternate graphical representation of a result of the detection of queue depth according to the implementation of FIG. 13.

Referring to FIG. 16, there is an alternative illustration of the almost full condition. In this illustration, there is shown variations of queue depth versus a position of the write pointer at a given "almost full" threshold. It can be seen that the graphical shape of the regions of "almost full" may be represented as a saw tooth waveform. Thus, it will be appreciated that, without any a priori knowledge of the read and write pointers of a queue, there is some uncertainty with respect to the queue depth at which an almost full condition will assert at a given threshold level. However, as shown in FIG. 16, the range of uncertainty is known to be approximately ⅛ of the full $2^{n-1}$ range of the pointers for a given threshold level for the condition to assert. Thus, for example, if there were 4 bits then the range would be 0 to $2^{(4-1)}$, or zero to fifteen. As shown in FIG. 16, It will be appreciated that although a queue depth detection technique as described above may be somewhat imprecise, for some applications, such as determining a queue "almost full" condition, the technique may be more than adequate. For instance, if the almost full condition is set for "pessimistic" as described above, then assertion of a queue almost full state at near half queue depth is typically more than adequate to provide notice, and hence enough time, to a memory system to take corrective action, such as having data read from a FIFO queue more quickly or squelching incoming data traffic to the FIFO queue. Likewise, the very minimal skid distance, for instance of approximately ⅛ of the queue depth for an optimistic threshold described above, is also typically sufficient in most applications to suppress the flow of data into a queue of a memory system in order to overflowing a FIFO queue. It will be appreciated that different threshold levels may be chosen for application in different memory systems, as appropriate.

As described above, the queue depth detection technique may operate on varying number of bits of read and write pointers to provide varying degrees of resolution. The technique for any number of examined bits is also scalable to varying sizes of memory space., since only the upper most significant bits are used. For instance, the 5-LUTs implementation shown on FIG. 13 may be used for detection of an almost full condition an a queue of any size greater than 8 memory locations, as only the upper four most significant bits (including the redundant MSB) are examined. As will be appreciated by one of skill in this art, that there is a minimum memory space location size that is associated with the number of bits examined given by $2^{(n-1)}$, where n is the number of bits in the read and write pointers, including the redundant MSB. Thus, the same two delay 5-LUT system described with reference to FIG. 13 may be used to determine an almost full condition on FIFO queues of any size greater than 8 memory locations, and would not require any additional logic to implement even as queue size increases significantly.

Figure 17A:
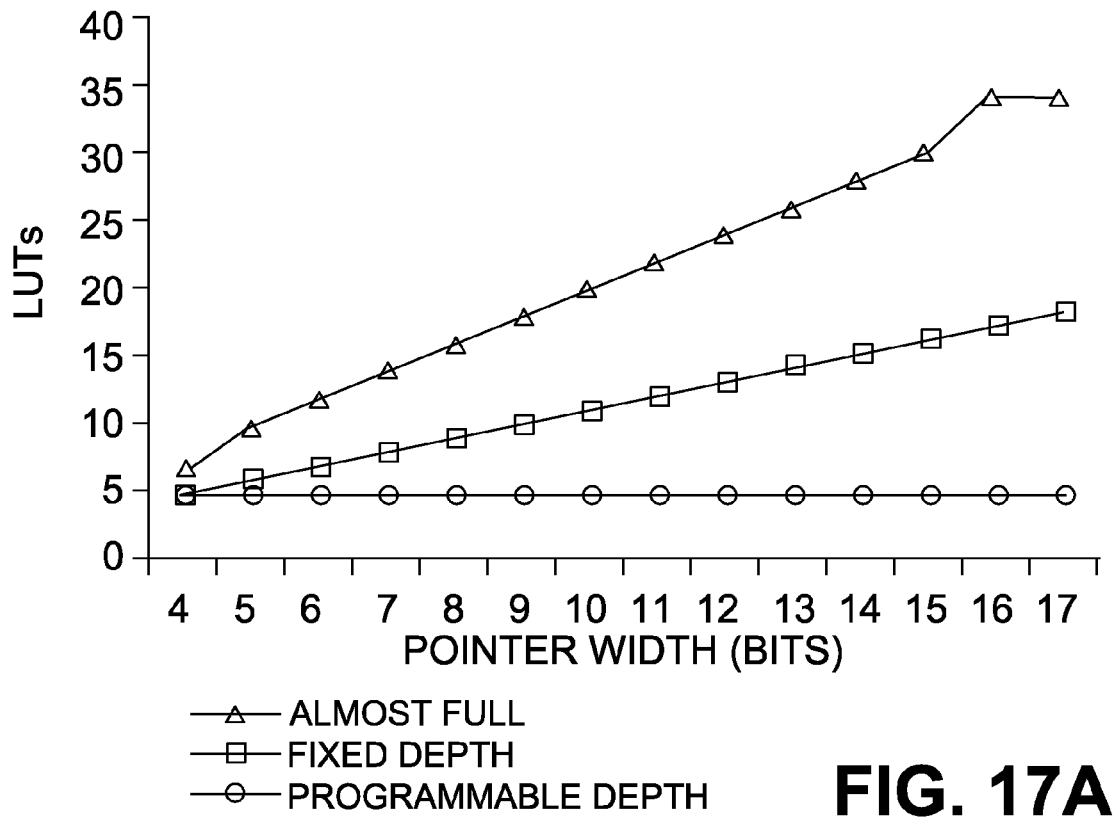
FIG. 17 are graphical representations of two comparisons between the implementation of the detection of queue depth of FIG. 13 with other techniques.
Figure 17B:
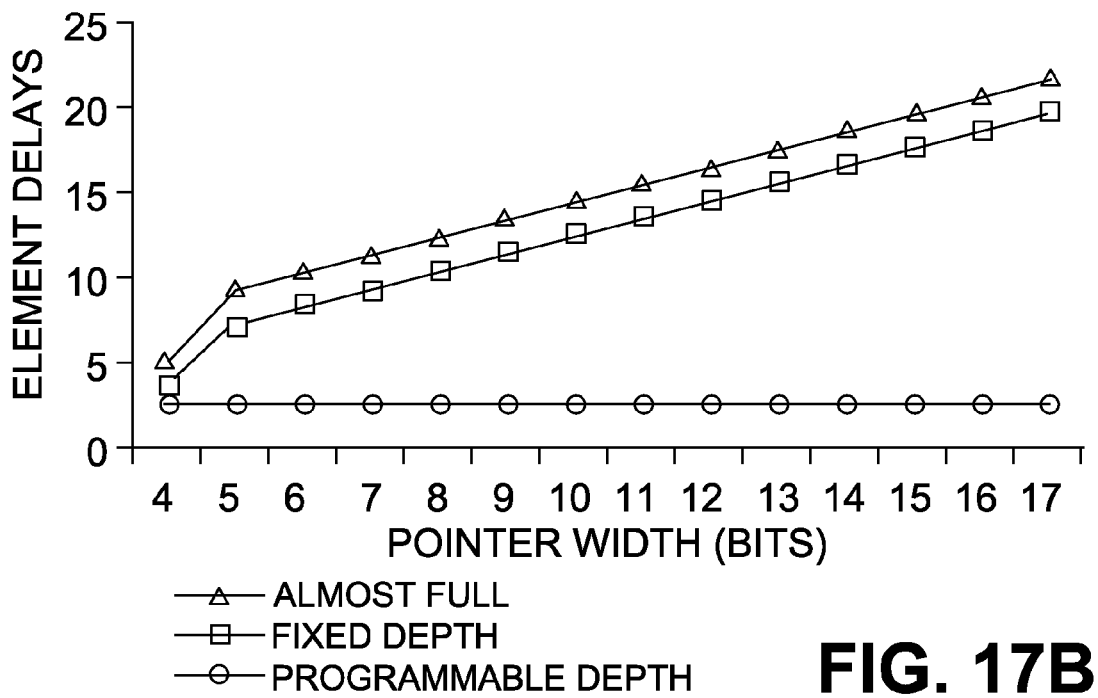

It will be appreciated that the highly scalable nature of this queue depth detection technique, and in particular the determination of a queue almost full condition, makes the technique compelling for use compared to some other techniques for queue depth detection. Referring to FIG. 17, it can be seen that while the embodiment described in FIG. 13 uses a fixed 5 LUTs and provides a fixed 2 element delays and is thus highly scalable (shown as "almost_full" in FIG. 17), other techniques for queue depth detection, such as a programmable depth threshold register or a hard-wired (i.e., fixed depth) detector, may not scale nearly as well with increasing pointer bit width in larger memory queues in some implementations.

Figures 18A, 18B:
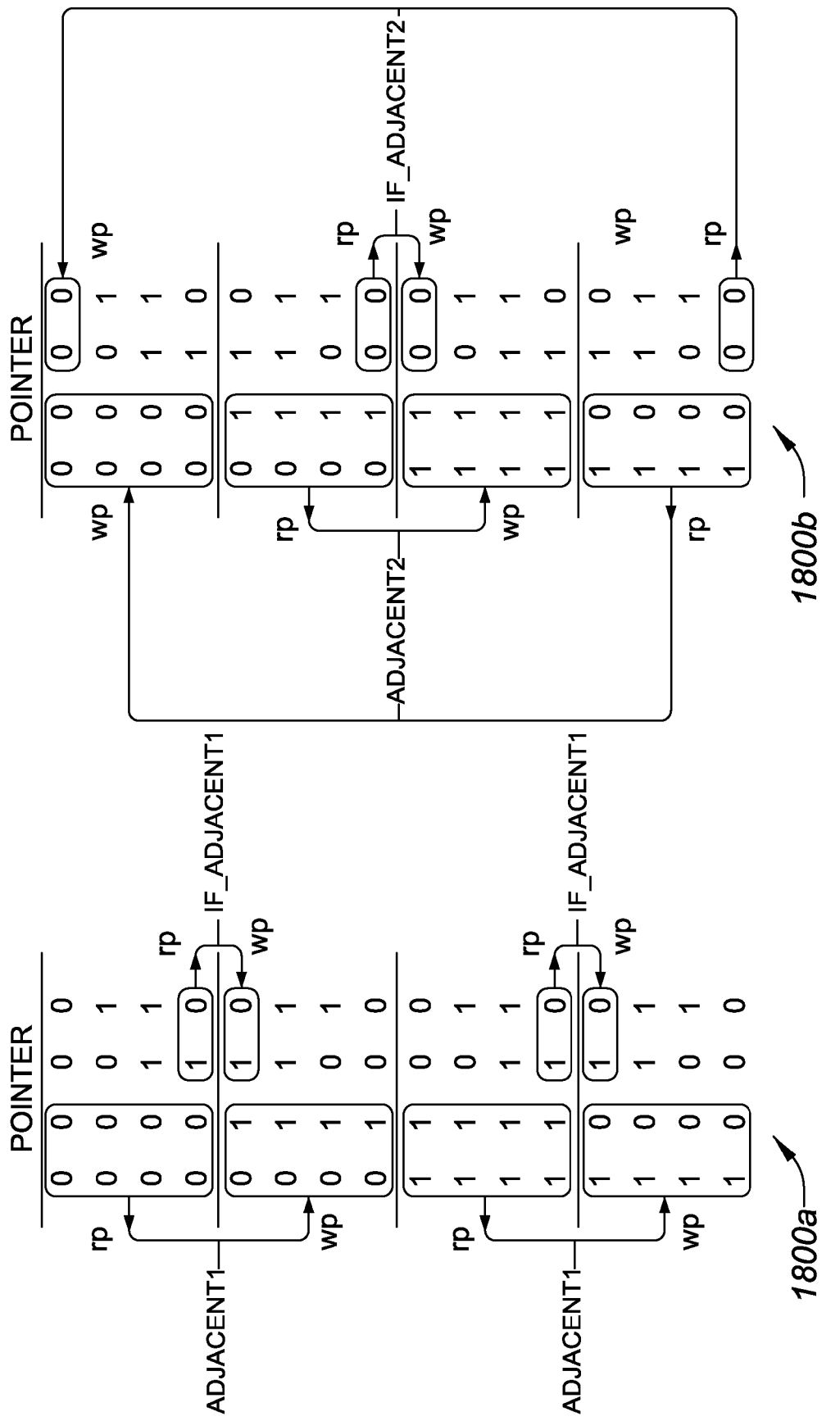
FIG. 18 are tables of information relating to the implementation of the detection of queue depth according to another embodiment of the present invention.

It will be appreciated that the above described technique may be used in other embodiments of memory systems. For instance, in another embodiment, the above described technique for queue depth detection, and particularly determination of a queue almost full condition, may be used with grey-coded pointers. A grey-coded pointer, or cyclic binary code, is a binary representation of number sin which each incremental number differs from the one that precedes it by one unit or bit, in one position. One of skill in this art would appreciated that since only one bit is changed at any one time, a period of potential value inconsistency, which may occur as two or more bits are changing from "0" to "1" or vice versa, is thereby avoided. The above described technique for detecting queue depth, and particularly queue almost full, may be used to with grey-coded pointers as well. However, it will be appreciated that additional logic in hardware, software, or both would be required to implement the technique with grey codes. For instance, considering only the "adjacent" situation, if the four upper most significant bits of pointer (read or write) are examined, then it will be appreciated that since there are now two fine-grained "if_adjacent" tables, an additional LUT is required for the if_adjacent comparison. Additionally, two course-grained comparisons will also need to be performed for the "adjacent" determination using 2 LUTs. Referring to FIG. 18, there is shown a set of grey code possibilities for the four most significant bits of each pointer. Table 1800*a* shows a first set of "adjacent" and "if_adjacent" combinations that may be selected, and table 1800*b* shows a second set of "adjacent" and "if_adjacent" combinations that may be selected for LUTs. Thus, to carry out a four-MSB comparison of grey coded pointers, a total of two comparisons are required for each of "adjacent" and "same" quadrants, which combines with the if_adjacent and if_same to require 11 LUTs in three delay stages to carry out.

It will be appreciated that the above-described implementation using LUTs in one or more static RAM-based FGPAs as shown in FIG. 13 may tend to provide a fast response time and reduce the logic, and hence cost, required for implementing the detection scheme. This may be particularly desirable for some applications requiring fast response times for the detection of an almost full or other queue depth condition, and can accept some tolerance with respect to the detection of the exact depth of a queue. For instance, in an application at an inter-chip interface for one or more network interface cards, such an implementation of queue depth detection using LUTs may be suitable as a low cost, high speed detection scheme. It will be appreciated that implementation of the techniques using software and hardware combinations besides FGPA is possible in other embodiments.

It will be appreciated that although the forgoing embodiments are with respect to binary pointers to memory locations, other memory addressing or indexing systems may be used in other embodiments.

Although the invention has been described with reference to certain specific embodiments, various modifications thereof will be apparent to those skilled in the art without department from the scope of the invention as outlined in the claims appended hereto.

I claim:

1. A method for detecting a queue depth of a memory queue in a memory system, comprising:
    estimating, in a network interface card, a start position of the memory queue by examining a portion of a queue start identifier of the memory queue;
    estimating, in the network interface card, an end position of the memory queue by examining a portion of a queue end identifier of the memory queue;
    comparing the start position and the end position to estimate the queue depth of the memory queue; and
    performing both a coarse-grained comparison of the first and second most significant bits of both the queue start identifier and the queue end identifier and a fine-grained comparison of the third and fourth most significant bits of both the queue start identifier and the queue end identifier to provide a warning window of time before queue full or queue empty conditions are encountered.

2. The method of claim 1, wherein the queue start identifier is a queue start memory pointer, and the queue end identifier is a queue end memory pointer.

3. The method of claim 2, wherein the memory queue is a first-in-first-out queue.

4. The method of claim 3, wherein the queue start and queue end memory pointers are binary pointers.

5. The method of claim 4, wherein the queue start identifier comprises binary bits, the portion of the queue start identifier is a subset of the binary bits of the queue start identifier, the queue end identifier comprises binary bits, and the portion of the queue end identifier is a subset of the binary bits of the queue end identifier.

6. The method of claim 5, wherein the subset of binary bits of the queue start identifier includes the two most significant bits of the queue start pointer, and the subset of binary bits of the queue end identifier includes the two most significant bits of the queue end pointer.

7. The method of claim 6, wherein the most significant bit of each of the queue start pointer and the queue end pointer is a redundant bit for determining a queue full and a queue empty condition.

8. The method of claim 7, wherein the subset of the binary bits of the queue start identifier comprises the four most significant bits of the queue start memory pointer, and the subset of the binary bits of the queue end identifier comprises the four most significant bits of the queue end memory pointer.

9. The method of claim 8, wherein the queue depth to be estimated is an almost empty condition of the memory queue.

10. The method of claim 9, wherein the queue depth to be estimated is an almost full condition of the memory queue.

11. The method of claim 10, wherein an adjustable threshold is provided for detecting the almost full condition.

12. The method of claim 11, wherein the first and second most significant bits of each of the queue start and queue end pointers define one of four pointer quarters in a pointer space, and the step of comparing the start position and the end position to estimate the queue depth of the memory queue comprises:
    determining from the first and second most significant bits of each of the queue start and queue end pointers whether the queue start and queue end pointers identify adjacent pointer quarters or the same pointer quarter; and
    examining the third and fourth most significant bits of each of the queue start and queue end pointers for detecting the almost full condition if the queue start and queue end pointers identify adjacent quarters or the same pointer quarter.

13. The method of claim 12, wherein the steps of determining whether the queue start and queue end pointers identify adjacent pointer quarters or the same pointer quarter, examining the third and fourth most significant bits and detecting the almost full condition are performed with the use of look-up tables.

14. The method of claim 13, wherein the look-up tables are found within one or more field programmable gate arrays.

15. The method of claim 12, wherein the steps of determining whether the queue start and queue end pointers identify adjacent pointer quarters or the same pointer quarter, examining the third and fourth most significant bits and detecting the almost full condition are performed with the use of application specific integrated circuits.

16. The method of claim 1, further comprising:
selecting among optimistic, nominal, and pessimistic thresholds for the coarse-grained comparison.

17. The method of claim 1, further comprising:
selecting among optimistic, nominal, and pessimistic thresholds for the fine-grained comparison.

18. The method of claim 1, further comprising:
subdividing each quarter of pointer space into four sub-quadrants.

19. The method of claim 1, further comprising:
performing the fine-grained comparison concurrently with the coarse-grained comparison.

20. The method of claim 1, further comprising:
combining results of both the coarse-grained comparison and the fine-grained comparison.

\* \* \* \* \*